May 21, 1940.　　　　　　　J. JACQUE　　　　　　　2,201,831
PULLEY ADJUSTMENT DEVICE
Filed Jan. 5, 1939

WITNESSES

INVENTOR
John Jacque
BY
Munn, Anderson & Liddy
ATTORNEYS

Patented May 21, 1940

2,201,831

UNITED STATES PATENT OFFICE 2,201,831

PULLEY ADJUSTMENT DEVICE

John Jacque, Richmond Hill, N. Y.

Application January 5, 1939, Serial No. 249,401

1 Claim. (Cl. 211—119.09)

This invention relates to pulley adjustment devices and more particularly to devices adapted for use with clotheslines or other ropes.

An object of the invention is to provide a means whereby the line may be kept under tension when in use but released when not in use. It is common knowledge that many ropes ordinarily used in clotheslines tend to stretch in use and to tighten when subjected to the weather or when wet. While it is desirable to keep a taut line in order to support clothes or other objects hung up on the line, it is likewise desirable to allow the line to hang loosely when not in use, in order to avoid unduly stretching the rope and to avoid undue tension on the line. Loosening the line when not in use tends to prolong its life and to avoid its breaking or snapping due to wet weather or freezing.

The present invention therefore provides a means whereby the tension may be varied and increased or lessened in accordance with the immediate needs.

While in illustrating my device I have shown it adapted to a clothesline, it will be appreciated that the invention is equally adaptable to any pulley.

In the accompanying drawing—

Figure 1:
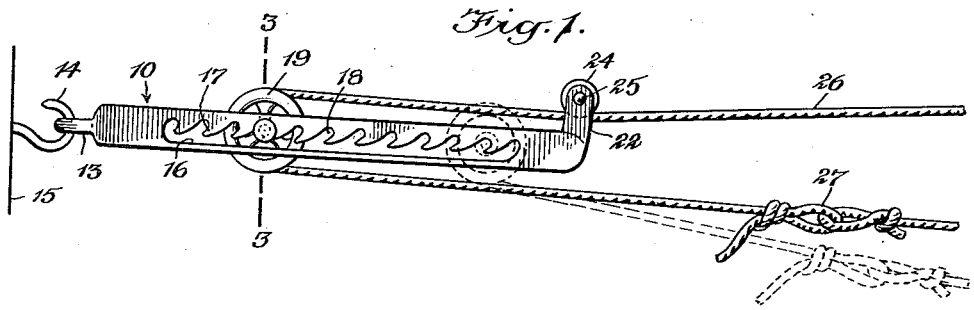
Fig. 1 is a side view of my device with the line in place.
Figure 2:
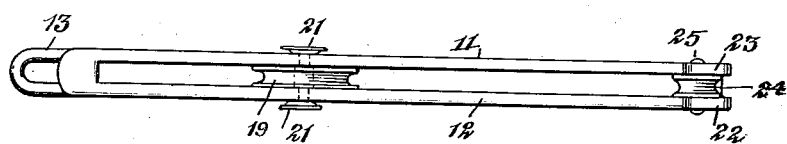
Fig. 2 is a top view thereof.
Figure 3:
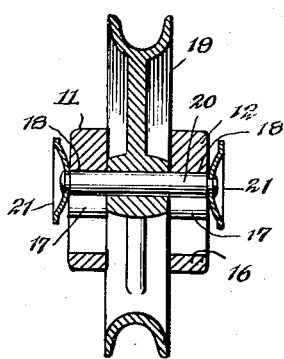
Fig. 3 is a cross-sectional view taken on the line 3—3 of Fig. 1 showing the pulley held under tension.
Figure 4:
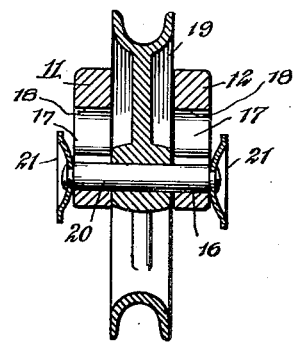
Fig. 4 is a cross-sectional view showing the pulley released.

Referring more particularly to the drawing, I provide a rack 10 which consists of two side members 11 and 12 joined at either end. The rack 10 may be made of wood, metal, alloys, or any suitable substance, but for practical purposes it is probably most easily made of pre-cast iron.

At one end of the rack 10 a loop 13 is provided to engage a hook or similar fastening means 14 fixed to a post or wall 15. The side members 11 and 12 are each provided with a groove 16 smooth on its lower surface and having a series of teeth or fingers 17 on its upper surface. These teeth or fingers 17 extend toward the looped end and form notches 18. A pulley wheel 19 mounted upon a spindle 20 is freely mounted in the groove 16. At either end of the spindle 20 are disks 21 of a diameter larger than the groove in order to properly position the pulley wheel 19. The disks 19 are preferably concave in order to form convenient thumb grips for the adjustment of the pulley.

At the outer end of the rack 10 are a pair of upwardly extending arms 22 and 23. Mounted in these arms is a wheel 24 upon a spindle 25. The rope or line 26 is fed under the wheel 24 and around the pulley wheel 19, and knotted or otherwise fastened at 27. It will be appreciated, of course, that the rope must be adjusted so that when the pulley wheel 19 is pulled rearwardly and set in the back notches 18 behind the fingers or teeth 17, the line 26 will be taut.

As shown in Fig. 1 in outline, the pulley may be dropped down and moved forwardly to release the tension on the line. In actual use when a line is placed under tension the loop 13 acts as a pivot and the rack 10 will take the direction of the line, the pulley 24 acting as a guide.

I claim:

A pulley adjustment device for use with a line comprising a rack, means on said rack fastening said rack to a stationary object, a groove in said rack running longitudinally of the length of the rack and having a smooth surface on the bottom of said groove, teeth on the upper surface of said groove, said teeth being inclined toward the inner portion of said rack, a line-engaging wheel mounted in said groove and adapted to be held in selective positions by said teeth, and a guiding wheel on the outer end of said rack to engage a line and position the rack with relation thereto.

JOHN JACQUE.